(12) United States Patent
Saito et al.

(10) Patent No.: US 10,633,289 B2
(45) Date of Patent: Apr. 28, 2020

(54) METHOD FOR MANUFACTURING GAS SENSOR ELEMENT

(71) Applicant: NGK SPARK PLUG CO., LTD., Nagoya-shi, Aichi (JP)

(72) Inventors: Yuri Saito, Komaki (JP); Tatsuhiko Muraoka, Komaki (JP); Masaki Nakagawa, Komaki (JP)

(73) Assignee: NGK SPARK PLUG CO., LTD, Nagoya (JP)

( * ) Notice: Subject to any disclaimer, the term of this patent is extended or adjusted under 35 U.S.C. 154(b) by 120 days.

(21) Appl. No.: 15/914,288

(22) Filed: Mar. 7, 2018

(65) Prior Publication Data

US 2018/0257990 A1    Sep. 13, 2018

(30) Foreign Application Priority Data

Mar. 8, 2017   (JP) ................... 2017-043591

(51) Int. Cl.
| | | |
|---|---|---|
| *C04B 35/10* | (2006.01) | |
| *C04B 35/634* | (2006.01) | |
| *C04B 35/626* | (2006.01) | |
| *G01N 27/407* | (2006.01) | |
| *B28B 3/00* | (2006.01) | |

(52) U.S. Cl.
CPC .............. *C04B 35/10* (2013.01); *B28B 3/003* (2013.01); *C04B 35/62695* (2013.01); *C04B 35/63416* (2013.01); *G01N 27/4071* (2013.01); *G01N 27/4073* (2013.01); *C04B 2235/3217* (2013.01); *C04B 2235/604* (2013.01)

(58) Field of Classification Search
CPC ...... C04B 35/10; B28B 3/003; G01N 27/4071
See application file for complete search history.

(56) References Cited

U.S. PATENT DOCUMENTS 7,819,996 B2 * 10/2010 Yasuda .................. B32B 18/00
  156/160
2016/0169829 A1 * 6/2016 Hills .................. G01N 27/4074
  205/779.5

FOREIGN PATENT DOCUMENTS

| JP | H08-50114 A | 2/1996 |
|---|---|---|
| JP | 2007-033374 A | 2/2007 |
| JP | 2013-217733 A | 10/2013 |

\* cited by examiner

*Primary Examiner* — Jacob T Minskey
*Assistant Examiner* — Jennifer A Kessie
(74) *Attorney, Agent, or Firm* — Stites & Harbison, PLLC; Jeffrey A. Haeberlin; Gary N. Stewart

(57) ABSTRACT

Disclosed is a manufacturing method of a gas sensor element. The gas sensor element has a plate shape extending in a direction of an axis thereof and includes: a detection portion arranged on a front end side of the gas sensor element to detect a specific gas component in a gas under measurement; and a porous protective layer formed around the detection portion. The manufacturing method of the gas sensor element is characterized in that the porous protective layer is formed by press forming of a raw material powder.

4 Claims, 4 Drawing Sheets

METHOD FOR MANUFACTURING GAS SENSOR ELEMENT

FIELD OF THE INVENTION

The present invention relates to a method for manufacturing a gas sensor element, particularly of the type having a porous protective layer formed on a detection portion of the gas sensor element.

BACKGROUND OF THE INVENTION

As gas sensors for fuel efficiency improvement and combustion control of internal combustion engines (including automotive engines), there are known oxygen sensors and air-fuel ratio sensors, each adapted to measure the concentration of oxygen in a gas under measurement (such as intake gas or exhaust gas). Among others, commonly used is a gas sensor having a plate-shaped gas sensor element that extends in the direction of an axis and includes, on a front end side thereof, a detection portion for detecting a specific gas component in a gas under measurement. In this type of gas sensor, a porous protective layer is formed around the detection portion so as to protect the detection portion from thermal shock by contact with water in the gas under measurement.

It has been common to form the porous protective layer by preparing a slurry containing a raw material of the porous protective layer, and then, spraying the slurry onto the detection portion as disclosed in JP 2007-33374A (FIG. 5) or dipping the detection portion into the slurry as disclosed in JP H08-50114A (FIG. 4). However, such spraying or dipping leads to variation in the thickness of the porous protective layer. There is thus developed a technique to form the porous protective film with a controlled thickness by injecting the slurry into a forming mold in which the detection portion is placed as disclosed in JP 2013-217733A (FIG. 2).

SUMMARY OF THE INVENTION

In the spraying process of JP 2007-33374A, the rate of adhesion of the slurry to the detection portion is low so that there arises a problem of increase in cost with increase in the amount of the slurry used. In the dipping process of JP H08-50114A, a corner region 500R of the porous protective layer 500 becomes thin as shown in FIG. 6 so that the gas sensor element (detection portion) 1000 may not be protected adequately. In the case of increasing the thickness of the corner region 500R of the porous protective layer 500 by the dipping process, any region of the porous protective layer 500 other than the corner region 500R becomes too thick so that there arises a problem of increase in cost, or increase in heat capacity (that is, increase in sensor element activation time), with increase in the thickness of the porous protective layer 500. In the injection forming process of JP 2013-217733A, it is necessary to prepare and use the slurry with a high content of liquid component (which is to be volatized by drying or firing) so that the porous protective layer tends to be cracked due to shrinkage during the drying and thus becomes low in strength.

It is accordingly an object of the present invention to provide a manufacturing method of a gas sensor element, capable of forming a porous protective layer at low cost while maintaining the strength of the porous protective layer and ensuring the thickness of a corner region of the porous protective layer.

According to one aspect of the present invention, there is provided a manufacturing method of a gas sensor element, the gas sensor element having a plate shape extending in a direction of an axis thereof and comprising: a detection portion arranged on a front end side of the gas sensor element to detect a specific gas component in a gas under measurement; and a porous protective layer formed around the detection portion, the manufacturing method comprising: forming the porous protective layer by press forming of a raw material powder.

As mentioned above, the porous protective layer is formed by press forming of the raw material powder. It is possible to form the porous protective layer at low cost with less loss of the raw material powder.

In the press forming process, the raw material power is compressed to follow the shape of a mold cavity. It is thus possible, by making the cross-sectional shape of the mold cavity approximately similar to the cross-sectional shape of the detection portion, to prevent a corner region of the porous protective layer from becoming thin and to ensure the thickness of the corner region of the porous protective layer without causing any region of the porous protective layer other than the corner region to become excessively thick. The following problems are hence suppressed: the detection portion cannot be protected adequately due to decrease in the thickness of the corner region of the porous protective layer; and increasing the thickness of the corner region of the porous protective layer results in any region of the porous protective layer other than the corner region becoming excessively thick, which leads to increase in cost or increase in sensor element activation time.

Furthermore, there is no need to use a slurry of the raw material powder in the press forming process because the porous protective layer is formed by compression of the raw material powder. It is thus possible to maintain and improve the strength of the porous protective layer.

It is further possible to vary the strength and porosity of the porous protective layer over a wider range, as compared to conventional processes, by changing a pressing pressure applied in the press forming process.

The gas sensor element may have a plurality of porous protective layers formed on the detection portion. In this case, it suffices to form at least an outermost one of the plurality of porous protective layers by press forming of the raw material powder.

In the above manufacturing method, the raw material powder may be subjected to graduation before the press forming.

By the granulation, a binder and an additive can be uniformly mixed in the raw material powder. It is thus possible to ensure the uniform thickness and properties of the porous protective layer.

In the above manufacturing method, the press forming may be performed by isostatic pressing with the use of a rubber mold.

By the isostatic pressing, the pressing pressure can be uniformly (isostatically) applied within the rubber mold. It is thus possible to ensure the more uniform thickness and properties of the porous protective layer with no compression variation of the raw material powder.

As mentioned above, the present invention enables low-cost formation of the porous protective layer while maintaining the strength of the porous protective layer and ensuring the thickness of the corner region of the porous protective layer.

The other objects and features of the present invention will also become understood from the following description.

DESCRIPTION OF EMBODIMENTS

Hereinafter, the present invention will be described below with reference to the drawings.

The following exemplary embodiment refers to a gas sensor element 100 for a so-called full-range air-fuel ratio sensor (as a gas sensor).

Figure 1:
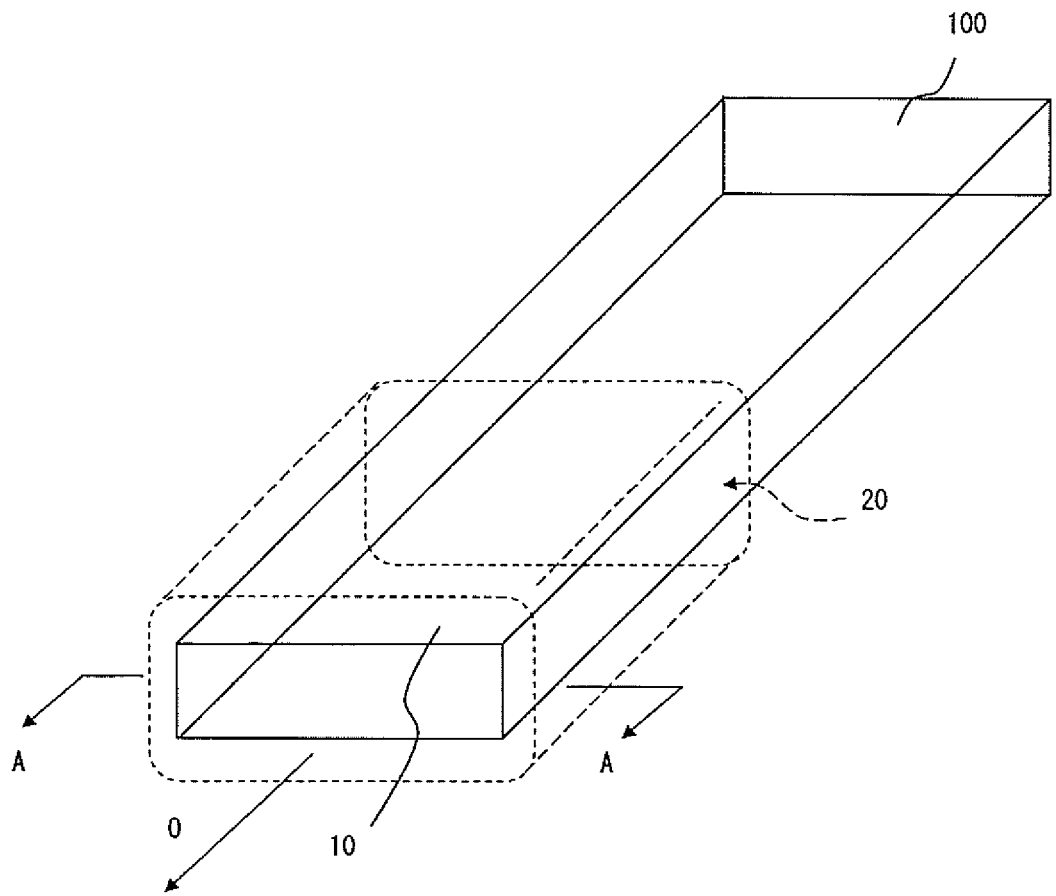
FIG. 1 is a schematic perspective view of a gas sensor element to which the present invention is applicable.

As shown in FIG. 1 the gas sensor element 100 has a plate shape extending in the direction of an axis O and includes: a detection portion 10 arranged on a front end side thereof to detect a specific gas component (i.e. oxygen) in a gas under measurement; and a porous protective layer 20 formed around the detection portion 10. Although not shown in the drawings, the gas sensor element 10 is mounted to the air-fuel ratio sensor by a metal shell etc.

Figure 2:
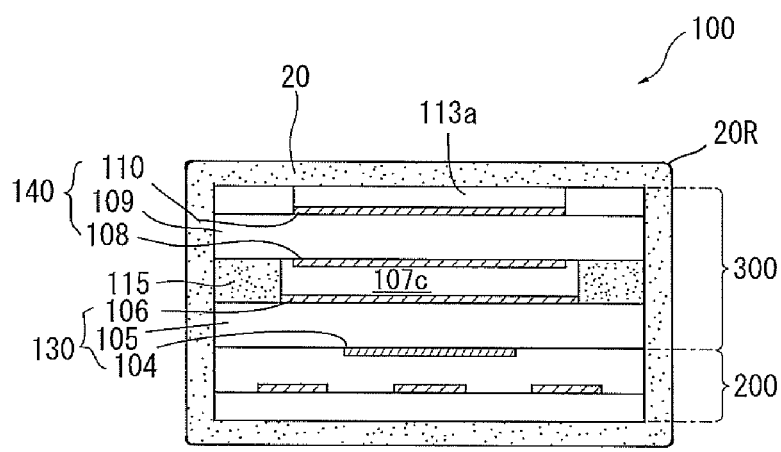
FIG. 2 is a cross-sectional view of the gas sensor element as taken along line A-A of FIG. 1.

More specifically, the gas sensor element 100 includes a sensor element part 300 and a heater part 200 stacked on the sensor element part 300 as shown in FIG. 2.

The sensor element part 300 is equipped with an oxygen concentration detection cell 130 and an oxygen pumping cell 140 and is configured to generate an output responsive to the concentration of oxygen in the gas under measurement such that the air-fuel ratio sensor can determine an air-fuel ratio based on the output from the sensor element part 300.

The oxygen concentration detection cell 130 has a first solid electrolyte body 105 and first and second electrodes 104 and 106 disposed on opposite sides of the first solid electrolyte body 105. The oxygen pumping cell 140 has a second solid electrolyte body 109 and third and fourth electrodes 108 and 110 disposed on opposite sides of the second solid electrolyte body 109.

There is a measurement room 107c defined between the oxygen pumping cell 140 and the oxygen concentration detection cell 130, with the second and third electrodes 106 and 108 facing and exposed to the measurement room 107c. The measurement room 107c is in communication with the outside at both sides in a width direction of the gas sensor element 100. A diffusion resistance member 115 is disposed in a communication area between the measurement room 107c and the outside so as to allow a predetermined limited rate of gas diffusion. Further, an outer surface of the fourth electrode 110 is covered by an electrode protective member 113a of porous material so that the oxygen pumping cell 140 pumps oxygen in and out via the fourth electrode 110, the electrode protective member 113 and the porous protective layer 20.

Namely, the detection portion 10 is constituted by the cells 130 and 140 (electrodes 104, 106, 108 and 110 and solid electrolyte bodies 105 and 109) and the measurement chamber 107c of the sensor element part 300.

The porous protective layer 20 is formed on the detection portion 10 of the gas sensor element 100 so as to cover the entire circumference of the detection portion 10. In the present embodiment, it suffices to cover the entire circumference of the detection portion 10 by the porous protective layer 20. In the case where the heater part 200 is stacked on the sensor element part 300 as in the present embodiment, the porous protective layer 20 is formed on an outer side of the stacked assembly of the sensor element part 300 and the heater part 200 so as to cover the entire circumference of the stacked assembly on the front end side of the gas sensor element 100. In the case where the heater part 200 is not provided, the porous protective layer 20 is formed on an outer side of the sensor element part 300 so as to cover the entire circumference of the sensor element part 300 on the front end side of the gas sensor element 100.

A manufacturing method of the gas sensor element 100 according to the present embodiment will be now explained below.

The manufacturing method of the gas sensor element 100 according to the present embodiment is characterized in that the porous protective layer 20 is formed by a press forming process. The press forming process can be performed by means of a press forming machine 2000 shown in FIGS. 3 and 4.

Figure 3:
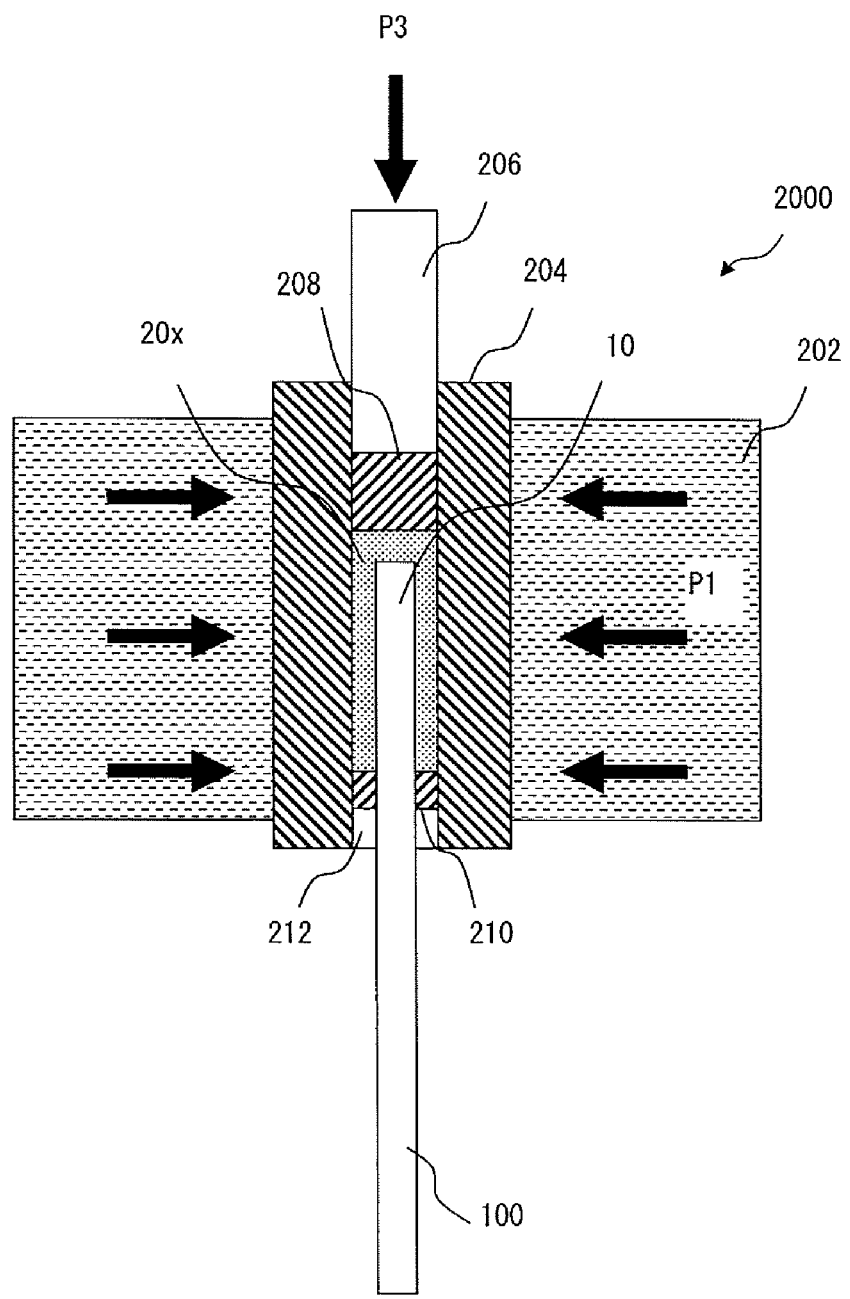
FIGS. 3 and 4 are vertical and horizontal cross-sectional views of a press forming machine usable for the formation of a porous protective layer during the manufacturing of the gas sensor element according to an exemplary embodiment of the present invention.
Figure 4:
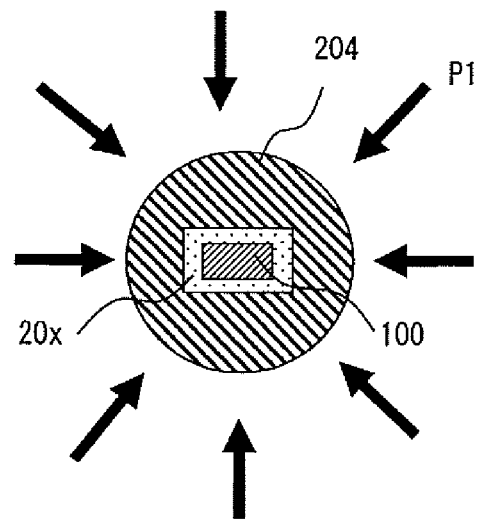

As shown in FIG. 3, the press forming machine 2000 is a cold isostatic press machine in which a rubber mold 204 is arranged in a water bath 202 such that the rubber mold 204 performs press forming under an isostatic (hydrostatic) pressure P1 applied by water within the water bath 201. The rubber mold 204 has a cylindrical shape with an inner through hole of rectangular cross section as shown in FIG. 4.

In the press forming process, the detection portion 10 of the gas sensor element 100 is first inserted in the inner though hole of the rubber mold 204 from one end side (i.e. lower side in FIG. 3) and placed in the inner through hole of the rubber mold 204 with a gap (cavity) left between the detection portion 10 and the inner through hole of the rubber mold 204. Then, a raw material powder 20x of the porous protective layer 20 is charged into the gap (cavity) between the detection portion 10 and the inner through hole of the rubber mold 204 from the other end side (i.e. upper side in FIG. 3). The raw material powder 20x used herein contains a raw material component of the porous protective layer 20 (such as ceramic material e.g. alumina) and a binder such as PVA (polyvinyl alcohol). Any additive such as volatile (vanishing) particles, slip additive (mold release), dispersant etc. may be added to the raw material powder 20x as needed.

In this state, the isostatic pressure P1 is applied to the rubber mold 204 from the outer circumferential side. By the application of the isostatic pressure P1, the rubber mold 204 is caused to compress and solidify the raw material powder 20x into the shape of the porous protective layer 20.

As shown in FIG. 3, the upper and lower sides of the rubber mold 204 are liquid-tightly sealed by fitting a rubber bush 208 and a hydraulic piston 206 into an upper opening end of the rubber mold 204 and fitting an annular rubber seal 210 and a support tube 212 around the gas sensor element 10 in a lower opening end of the rubber mold 204, with a rear end side of the gas sensor element 10 protruding outside from the lower opening end of the rubber mold 204. Further, the hydraulic piston 206 is moved downward under a hydraulic pressure P3 to compress the raw material powder 20x in the rubber mold 204.

After that, the gas sensor element 100 is removed from the rubber mold 204. The thus-molded porous protective layer 20 is subjected to firing.

As explained above, the porous protective layer 20 is formed by press forming of the raw material powder 20x in the present embodiment. It is thus possible to form the porous protective layer 20 at low cost with less loss of the raw material powder 20x.

In the press forming process, the raw material powder 20x is compressed to follow the shape of the mold cavity (in the present embodiment, the inner though hole of the rubber mold 204). It is thus possible, by making the cross-sectional shape of the mold cavity approximately similar to the cross-sectional shape of the detection portion 10, to prevent a corner region 20R of the porous protective layer 20 from becoming thin and to ensure the thickness of the corner region 20R of the porous protective layer 20. For example, the corner region 20R of the porous protective layer 20 attains a sufficient thickness, with less rounded corner, to reliably cover the corner of the detection portion 10 as shown in FIG. 2. The following problems are hence suppressed: the detection portion 10 cannot be protected adequately due to decrease in the thickness of the corner region 20R of the porous protective layer 20; and increasing the thickness of the corner region 20R of the porous protective layer 20 results in any region of the porous protective layer 20 other than the corner region 20R becoming excessively thick, which leads to increase in cost or increase in sensor element activation time.

Furthermore, there is no need to use a slurry of the raw material powder 20x in the press forming process because the porous protective layer 20 is formed by compression of the raw material powder 20x. It is thus possible to maintain and improve the strength of the porous protective layer 20.

It is further possible to vary the strength and porosity of the porous protective layer 20 over a wider range, as compared to conventional processes, by changing the pressing pressure applied in the press forming process.

In the present embodiment, the press forming process is performed by isostatic pressing with the use of the rubber mold 204 as explained above. By the isostatic pressing, the isostatic pressure P1 (as the pressing pressure) can be uniformly (isostatically) applied within the rubber mold 204. It is thus possible to ensure the more uniform thickness and properties of the porous protective layer. The adoption of such isostatic pressing is advantageous in that it is possible to ensure the uniform thickness and properties of the porous protective layer 20 without causing compression variation of the raw material powder 20x.

It is preferable that the raw material powder 20x is subjected to granulation before the press forming process because the binder and the additive can be uniformly mixed in the raw material powder 20x by the granulation. The use of such a uniformly mixed raw material powder 20x is advantageous in that it is possible to ensure the uniform thickness and properties of the porous protective layer 20. The granulation can be performed by, for example, spraying a slurry of the raw material powder 20x with the binder and the additive into a gas stream according to a spray drying technique.

Although the present invention has been described with reference to the above specific embodiment, various changes and modifications of the above embodiment are possible.

In the above embodiment, the gas sensor element has one porous protective layer formed on the detection portion. Alternatively, the gas sensor element may have a plurality of porous protective layers formed on the detection portion. In this case, it suffices to form at least an outermost one of the plurality of porous protective layers by the press forming of the raw material powder. Two or more or all of the porous protective layers may be formed by the press forming of the raw material powder. In the case where the gas sensor element has a plurality of porous protective layers, the material, thickness and porosity of the respective porous protective layers can be the same or different. Although there is no particular limitation on the thickness of the porous protective layers, the thickness of each of the porous protective layers can be set to e.g. 100 to 1000 μm.

The press forming process is not limited to the above-mentioned isostatic press forming with the rubber mold. It is alternatively feasible to perform the press forming process by means of a molding machine 300 shown in FIG. 5. Herein, the paper surface direction of FIG. 5 corresponds to the direction of the axis O of the gas sensor element 100.

Figure 5:
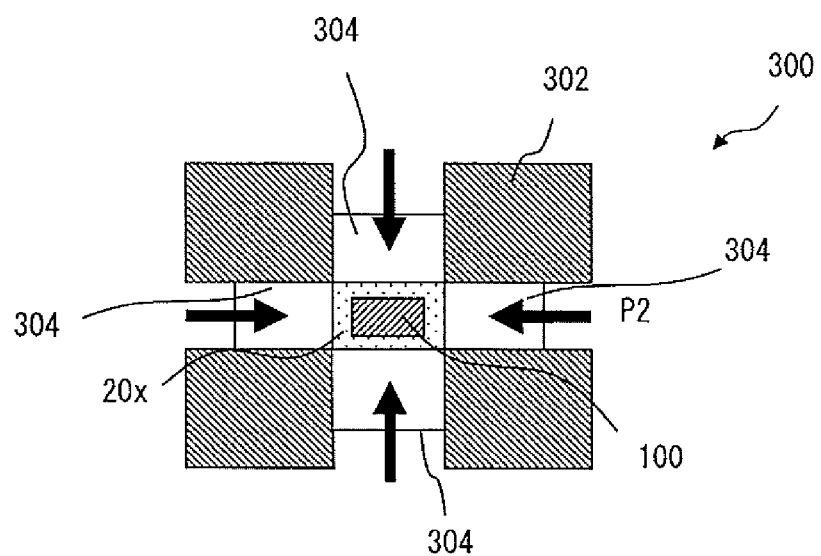
FIG. 5 is a horizontal cross-sectional view of another type of press forming machine usable for the formation of a porous protective layer during the manufacturing of the gas sensor element according to the exemplary embodiment of the present invention.
Figure 6:
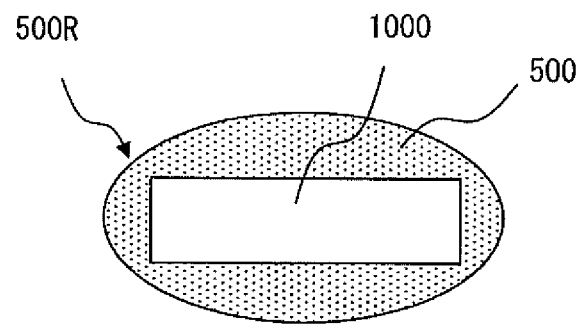
FIG. 6 is a cross-sectional view of a conventional porous protective layer on a gas sensor element.

As shown in FIG. 5, the molding machine 300 has four movable mold members 304 located facing four side surfaces of the gas sensor element 100, a front movable mold member (not shown) located facing a front end surface of the gas sensor element 100 and a holding member 302 that holds the respective movable mold members.

The detection portion 10 of the gas sensor element 100 is placed in an inner space surrounded by the movable mold members, with a gap (cavity) left between the detection portion 10 and the movable mold members. Then, the raw material powder 20x is charged into the gap (cavity) between the detection portion 10 and the movable mold members. In this state, a pressure P2 is applied to each of the movable mold members in a direction that brings the movable mold members closer together and reduces the cavity. By the application of the pressure P2, the raw material powder 20x is compressed from five sides by the movable mold members and thereby solidified into the shape of the porous protective layer 20. After that, the gas sensor element 100 is removed from the rubber mold 204. The thus-molded porous protective layer 20 is subjected to firing.

The use of the molding machine 300 is advantageous in that it is possible to accurately control the movement positions of the movable mold members and attain the high dimensional accuracy of the porous protective layer 20 although the pressure P2 applied is not isostatic.

By way of example, the present invention is directed to the full-range air-fuel ratio sensor in the above embodiment. However, the present invention is applicable to any type of gas sensor, not only air-fuel ratio sensor but also oxygen sensor, NOx sensor or HC sensor, as long as the gas sensor has a plate-shaped gas sensor element.

The entire contents of Japanese Patent Application No. 2017-043591 (filed on Mar. 8, 2017) are herein incorporated by reference. The scope of the invention is defined with reference to the following claims.

What is claimed is:

1. A manufacturing method of a gas sensor element, the gas sensor element having a plate shape extending in a direction of an axis thereof and comprising: a detection portion arranged on a front end side of the gas sensor element to detect a specific gas component in a gas under measurement; and a porous protective layer formed around the detection portion, the manufacturing method comprising: forming the porous protective layer by press forming of a raw material powder, wherein the press forming is performed by placing the detection portion of the gas sensor element in a mold, charging the raw material powder into the mold, and then compressing the raw material powder in the mold with the application of a pressure.

2. The manufacturing method according to claim 1, wherein the gas sensor element comprises a plurality of porous protective layers formed on the detection portion; and wherein at least an outermost one of the plurality of porous protective layers is formed by press forming of the raw material powder.

3. The manufacturing method according to claim 1, further comprising granulating the raw material powder.

4. The manufacturing method according to claim 1, wherein the press forming is performed by isostatic pressing with the use of a rubber mold.

\* \* \* \* \*